(12) United States Patent
Miller et al.

(10) Patent No.: US 11,474,624 B2
(45) Date of Patent: Oct. 18, 2022

(54) VEHICLE USER INTERFACE (UI) MANAGEMENT

(71) Applicant: Honda Motor Co., Ltd., Tokyo (JP)

(72) Inventors: Ross Cameron Miller, Hilliard, OH (US); Matthew Conway, Seattle, WA (US); Richard Alan Ewing, Jr., Renton, WA (US)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 16/888,075

(22) Filed: May 29, 2020

(65) Prior Publication Data

US 2020/0293126 A1 Sep. 17, 2020

Related U.S. Application Data

(63) Continuation of application No. 15/828,583, filed on Dec. 1, 2017, now Pat. No. 10,698,507, which is a
(Continued)

(51) Int. Cl.
| | |
|---|---|
| *G06F 3/0354* | (2013.01) |
| *G06F 3/041* | (2006.01) |
| *G06F 3/04886* | (2022.01) |
| *G06F 3/0484* | (2022.01) |
| *B60K 35/00* | (2006.01) |
| *G09G 5/00* | (2006.01) |

(Continued)

(52) U.S. Cl.
CPC ......... *G06F 3/03547* (2013.01); *B60K 35/00* (2013.01); *G06F 3/0362* (2013.01); *G06F 3/0412* (2013.01); *G06F 3/0484* (2013.01); *G06F 3/04886* (2013.01); *G09G 5/00* (2013.01); *B60K 2370/11* (2019.05); *B60K 2370/111* (2019.05); *B60K 2370/1442* (2019.05); *B60K 2370/151* (2019.05); *B60K 2370/52* (2019.05); *G06F 3/0482* (2013.01); *G06F 2203/04104* (2013.01); *G06F 2203/04803* (2013.01); *G09G 2340/145* (2013.01); *G09G 2354/00* (2013.01); *G09G 2380/10* (2013.01)

(58) Field of Classification Search
CPC .................................................. G06F 3/03547
USPC ........................................................ 345/173
See application file for complete search history.

(56) References Cited

U.S. PATENT DOCUMENTS

| | | |
|---|---|---|
| 6,333,753 B1 | 12/2001 | Hinckley |
| 7,653,883 B2 | 1/2010 | Hotelling et al. |
| (Continued) | | |

*Primary Examiner* — Albert K Wong
(74) *Attorney, Agent, or Firm* — Rankin, Hill & Clark LLP

(57) ABSTRACT

According to one or more aspects, a system for vehicle user interface (UI) management includes an interface component, an operation component, a presentation logic, and a rendering component. The interface component may include a display portion located at a first position and an input portion located at a second position different than the first position. The input portion may receive one or more user inputs and include a touch sensitive portion, a first button, and a second button. The operation component may select one or more modes for a UI based on one or more of the user inputs. The presentation logic may generate one or more objects based on a selected mode and presence information associated with one or more of the user inputs. The rendering component may render one or more of the objects to form a composite image at the display portion.

20 Claims, 11 Drawing Sheets

Related U.S. Application Data continuation of application No. 14/736,303, filed on Jun. 11, 2015, now Pat. No. 9,874,952.

(51) Int. Cl.
*G06F 3/0362* (2013.01)
*G06F 3/0482* (2013.01)

(56) References Cited

U.S. PATENT DOCUMENTS

| | | |
|---|---|---|
| 8,330,731 B2 | 12/2012 | Ausbeck |
| 8,381,135 B2 | 2/2013 | Hotelling et al. |
| 8,555,184 B2 | 10/2013 | Hong et al. |
| 8,612,856 B2 | 12/2013 | Hotelling et al. |
| 8,667,425 B1 * | 3/2014 | Burke .......... G06F 3/04883 715/863 |
| 8,856,827 B1 | 10/2014 | Krause et al. |
| 9,195,633 B2 | 11/2015 | Enami et al. |
| 9,753,569 B2 | 9/2017 | Han et al. |
| 2004/0122572 A1 | 6/2004 | Ichinose |
| 2009/0219255 A1 | 9/2009 | Woolley et al. |
| 2009/0273571 A1 * | 11/2009 | Bowens .......... G06F 3/04883 345/173 |
| 2011/0126100 A1 | 5/2011 | So et al. |
| 2011/0128164 A1 | 6/2011 | Kang et al. |
| 2012/0139847 A1 | 6/2012 | Hunt |
| 2012/0182227 A1 | 7/2012 | Wu et al. |
| 2012/0212420 A1 * | 8/2012 | Shin .......... G06F 3/04886 345/173 |
| 2012/0272193 A1 | 10/2012 | Michaelis |
| 2013/0016048 A1 | 1/2013 | So et al. |
| 2013/0141374 A1 | 1/2013 | Woolley |
| 2013/0067394 A1 | 3/2013 | Nan et al. |
| 2013/0307801 A1 | 11/2013 | Nam |
| 2014/0215393 A1 * | 7/2014 | Schwartz .......... G06F 3/04842 715/810 |
| 2015/0227221 A1 * | 8/2015 | Tsunoda .......... H04M 1/72415 345/173 |
| 2015/0286328 A1 | 10/2015 | Lee et al. |
| 2016/0282948 A1 | 9/2016 | Wu |
| 2016/0306606 A1 | 10/2016 | Ko et al. |
| 2017/0168638 A1 | 6/2017 | Shi et al. |

* cited by examiner

VEHICLE USER INTERFACE (UI) MANAGEMENT

CROSS-REFERENCE TO RELATED APPLICATIONS

This application is a continuation of and claims priority to U.S. Non-Provisional patent application Ser. No. 15/828,583 entitled "VEHICLE USER INTERFACE (UI) MANAGEMENT", filed on Dec. 1, 2017, which is a continuation of and claims priority to U.S. Non-Provisional patent application Ser. No. 14/736,303 entitled "VEHICLE USER INTERFACE (UI) MANAGEMENT", filed on Jun. 11, 2015; the entirety of the above-noted application(s) is incorporated by reference herein.

BACKGROUND

Generally, vehicles may be equipped with displays, such as center console displays, touch screen displays, or other displays. These displays may be utilized to render information for a driver, passenger, or other occupant of a vehicle. For example, a display may render the day, the time, navigation instructions, etc. As another example, a display may render information for menu navigation. Consoles, such as center consoles, within vehicles may include color displays, meter instrumentation, or other indicators, etc. Often, a user interface (UI) within a vehicle may be controlled using control elements on a touchscreen such that one or more users, occupants, passengers, drivers, or operators of a vehicle may make a selection using the control elements on the touchscreen.

BRIEF DESCRIPTION

According to one or more aspects, a system for vehicle user interface (UI) management includes an interface component, an operation component, a presentation logic, and a rendering component. The interface component may include a display portion located at a first position and an input portion located at a second position different than the first position. The input portion may receive one or more user inputs. The operation component may select one or more modes for a UI based on one or more of the user inputs. The presentation logic may generate one or more objects based on a selected mode and presence information associated with one or more of the user inputs. The rendering component may render one or more of the objects to form a composite image at the display portion.

The input portion may be a touchpad which includes a touch sensitive portion, a first button, and a second button. The first buttons may be a first subset of the touch sensitive portion and the second button may be a second subset of the touch sensitive portion. The system may include a media component which receives media, audio content, or video content from one or more content providers or media sources. The operation component may select one or more of the modes from at least one of an active application mode, a control mode, an application menu mode, a home screen mode, or an event mode. The presentation logic may generate one or more subsequent frames for respective objects by adjusting one or more perceptual visual properties for respective objects, such as at least one of a color, an opacity, line weight, orientation, position, scale, stroke style (dotted, dashed, solid, etc.), or a size of one or more graphic elements from one or more of the objects. The rendering component may render one or more of the subsequent frames for respective objects to form a subsequent frame composite image at the display portion as an animation which transitions from the composite image to the subsequent frame composite image.

In one or more embodiments, the system for vehicle UI management may include a communication component receiving one or more graphic elements or one or more content items associated with one or more of the objects. Presence information associated with one or more of the user inputs may be indicative of whether a user is in contact with the input portion of the interface component. The presentation logic may generate a control object based on presence information indicating that a user is in contact with the input portion of the interface component. Additionally, the presentation logic may generate an active application object based on the selected mode. The presentation logic may generate a background object based on presence information indicating that the user is in contact with the input portion of the interface component.

According to one or more aspects, the rendering component may render the composite image from the control object, the active application object, and the background object such that the composite image comprises the control object superimposed on the active application object, superimposed on the background object. According to other aspects, the rendering component may render the composite image from the control object and the active application object such that the composite image comprises the control object superimposed on the active application object.

According to one or more aspects, a method for vehicle user interface (UI) management includes receiving one or more user inputs, selecting one or more modes for a UI based on one or more of the user inputs, generating one or more objects based on a selected mode and presence information associated with one or more of the user inputs, and rendering one or more of the objects to form a composite image. The selected mode may be at least one of an active application mode, a control mode, an application menu mode, a home screen mode, or an event mode.

The method may include updating one or more graphic elements of one or more of the objects by adjusting at least one of a color, an opacity, or a size of one or more of the graphic elements, fading in or fading out one or more of the objects based on the presence information, or generating one or more objects based on multi-touch user inputs.

According to one or more aspects, a system for vehicle user interface (UI) management is provided. The system may include an interface component, an operation component, a presentation logic, and a rendering component. The interface component may include a display portion located at a first position and an input portion located at a second position different than the first position. The second position of the input portion may be located along an armrest or on a steering wheel of a vehicle. The input portion may receive one or more user inputs, such as user inputs from a driver, operator, or occupant of a vehicle.

The operation component may select one or more modes for a UI based on one or more of the user inputs. The presentation logic may generate one or more objects based on a selected mode and presence information associated with one or more of the user inputs. The rendering component may render one or more of the objects to form a composite image at the display portion.

DETAILED DESCRIPTION

Figure 1:
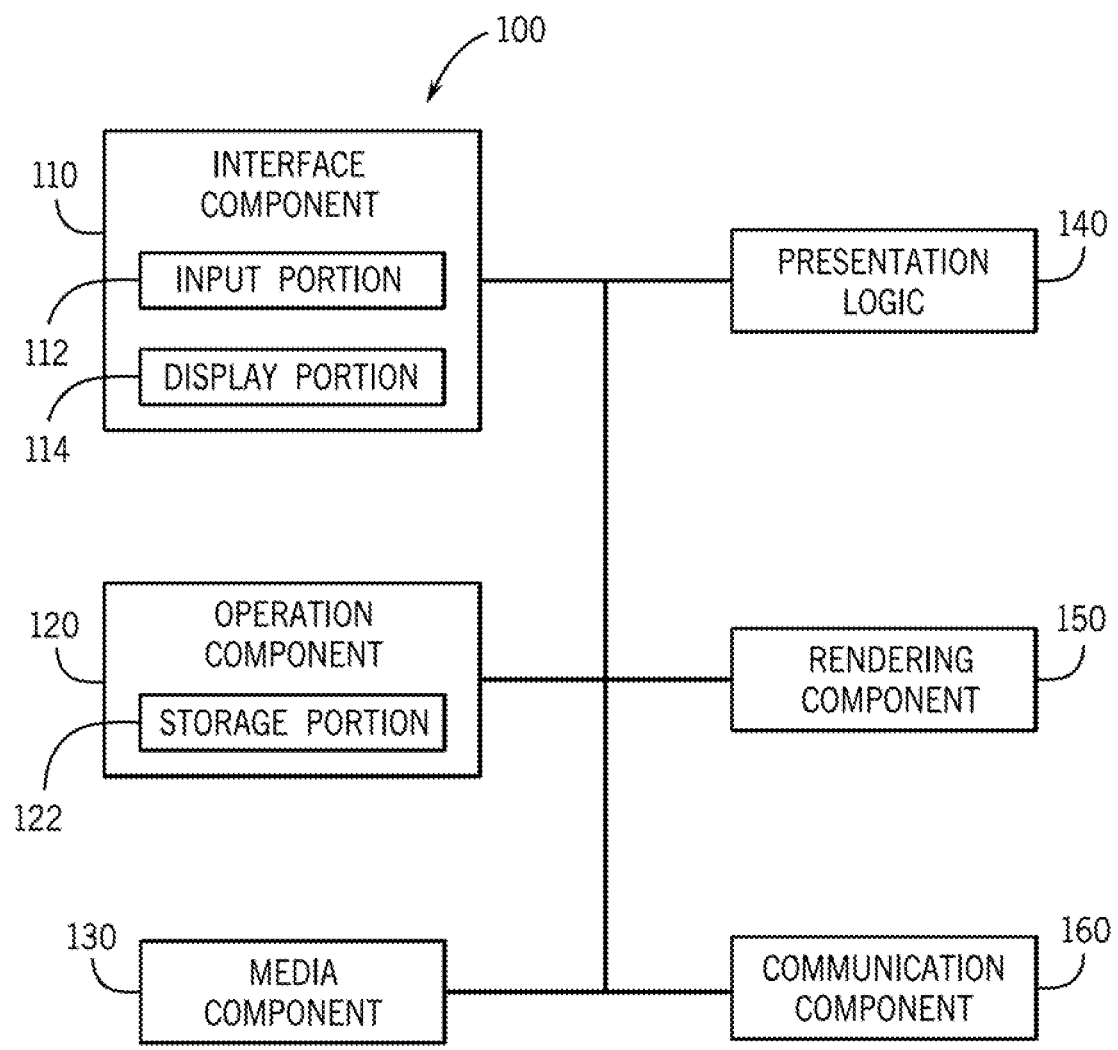
FIG. 1 is an illustration of an example component diagram of a system for vehicle user interface (UI) management, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 11:
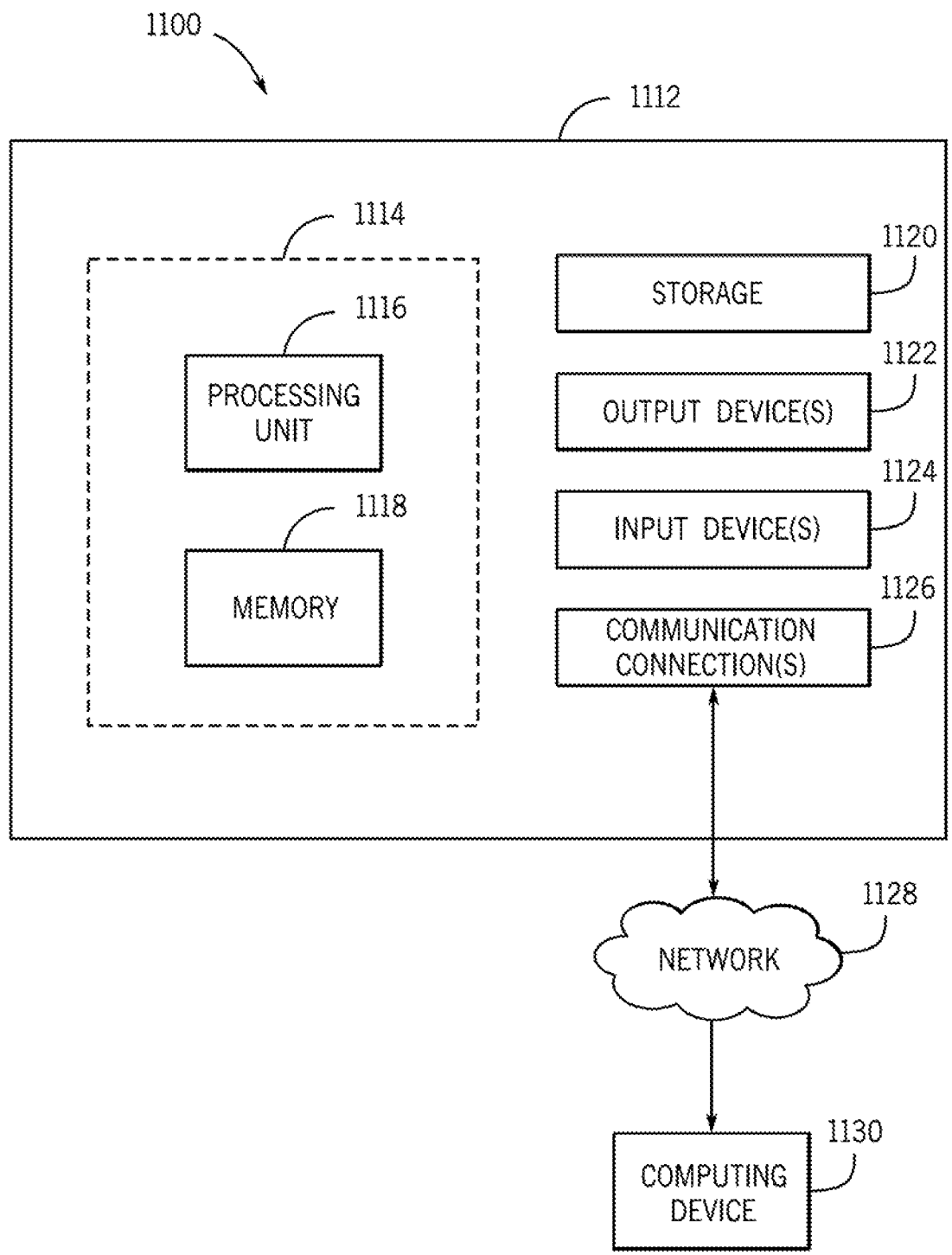
FIG. 11 is an illustration of an example computing environment where one or more of the provisions set forth herein are implemented, according to one or more embodiments.

For one or more of the figures herein, one or more boundaries, such as 1114 of FIG. 11, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, the term "user" may include a driver of a vehicle, an operator of a vehicle, a passenger of a vehicle, an occupant of a vehicle, an individual, an entity, etc. As used herein, the term "content item" may include shortcuts, icons, tiles, media items, functional icons, shortcut icons, items, applications, 'apps', images (e.g., which may include one or more objects or one or more graphic elements), media, animations, sounds, songs, renderings, etc. Further, applications or 'apps' may be launched, executed, or run (e.g., via a processing unit or memory) on an operating system of a vehicle user interface. As used herein, the term "rendering" may include presenting, displaying, or playback of video, audio, or other content.

As used herein, a "composite image" (e.g., of a user interface or vehicle UI) may include or be formed by overlaying one or more objects on one another. An "object" may include one or more graphic elements. Examples of objects may include a background object, an active application object, a control object, an instruction object, a preview object, a menu object, an event object, etc. As used herein, a "background" may include or refer to a pattern (e.g., a grid pattern, a dot pattern, etc.). A "graphic element" may include a variety of content, such as album art, an album name, an artist name, a station name, a station number, an image, a contact photo, an image, an icon, a placeholder image, a song title, a time scrubber, one or more controls, volume controls, seek, pause, play, a cursor, current selection indicator, an interface, or one or more portions thereof.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such an inference may result in the construction of new events or new actions from a set of observed events or stored event data, whether or not the events are correlated in close temporal proximity, and whether the events and data come from one or several event and data sources.

In one or more embodiments, a vehicle user interface (UI) is provided which is responsive to user input or touch input. For example, when a touch input or user input is detected at a touchpad or track pad, different objects of an interface may appear or be rendered. Accordingly, certain functionality may appear or disappear as a user interacts with the vehicle UI. In this way, objects or graphic elements within an object may be adjusted (e.g., moved, animated, changed in opacity, color, size, shape, or frame rate) based on responsiveness to user input or presence information associated therewith.

FIG. 1 is an illustration of an example component diagram of a system 100 for vehicle user interface (UI) management, according to one or more embodiments. The system 100 for vehicle UI management may include an interface component 110, an operation component 120, a media component 130, a presentation logic 140, a rendering component 150, and a communication component 160.

The interface component 110 may include a display portion 114 and an input portion 112 such that different portions are located in different locations or at different positions. The display portion 114 may be a liquid crystal display (LCD), a light emitting diode (LED) display, a heads up display, an augmented reality display, etc. The display portion 114 may display rendered images, such as composite images for the vehicle UI. In one or more embodiments, the display portion 114 may be located at a first position. For example, the first position of the display portion 114 may be a center console position, a dashboard position, a windshield position, a position projected in view of a driver or user, etc.

The input portion 112 of the interface component 110 may receive one or more user inputs. The input portion 112 may enable a user to interact with graphic elements or content items of the vehicle UI by providing the system 100 for vehicle UI management with different types of user inputs.

The input portion 112 may be a touchpad, a track pad, a clickable touchpad, etc. The touchpad or input portion 112 may include one or more touch sensitive portions, one or more pressure sensitive portions, one or more clickable portions or clickable buttons, one or more buttons (e.g., a first button, a second button, a back button, a home button), etc. In one or more embodiments, one or more of the buttons of the input portion 112 may be implemented as soft buttons within one or more of the touch sensitive portions. In other words, a first button could be defined as a first subset of one of the touch sensitive portions. Similarly, a second button could be defined as a second subset of one of the touch sensitive portions. In this way, these 'soft' buttons may be defined by arbitrary boundaries within a touch sensitive or pressure sensitive portion. In one or more embodiments, a user could make a selection with a soft button by double tapping the corresponding touch or pressure sensitive portion or by providing a multi-finger user input, for example. Alternatively, in other embodiments, respective buttons may be physical buttons implemented as hardware or hardware buttons.

In yet another embodiment, the input portion 112 may sense or detect user input as a user approaches a predefined area such that the user is not required to be in physical contact with the input portion 112 for the input portion 112 to receive or determine a user input.

Regardless, the combination of touch sensitive portions, pressure sensitive portions, and buttons enables a user, such as a driver, passenger, operator, or other occupant of a vehicle, to interact with a vehicle user interface. The interface component 110 may receive one or more user inputs indicative of a command or selection of a content item, and thus control one or more aspects of a vehicle, such as by launching one or more applications, for example. This may be achieved because the input portion 112 of the interface component 110 may sense one or more inputs provided at the input portion 112 by a user. In other words, when a user touches the touchpad, makes a selection using a button of the input portion 112, or drags a finger (or fingers) across the touchpad, the interface component 110 senses or detects these actions as user inputs, and transmits these user inputs to the operation component 120 or other components of the vehicle UI, which may respond to the user input accordingly, thus providing vehicle UI interactivity with user inputs from the user.

The input portion 112 may be located at a second position, which is different than the first position of the display portion 114. For example, the second position of the input portion 112 may be along an armrest of a vehicle, on a steering wheel of a vehicle, adjacent to a cup holder, below a center console, etc. Stated another way, the input portion 112 of the interface component 110 may be located remote from the display portion 114 of the interface component 110.

The operation component 120 may select or place the system 100 for vehicle UI management in one or more modes or one or more sub-modes based on one or more of the user inputs, such as user inputs received at the input portion 112. The operation component 120 may manage, control, or switch the system 100 for vehicle UI management between one or more operating modes or one or more modes based on these user inputs, thereby enabling mode selection or providing mode control to a user, operator, passenger, etc. The operation component 120 may engage the system 100 for vehicle UI management in one or more modes and cause the presentation logic 140 generate one or more graphic elements or one or more objects for a user interface based on a selected mode, thereby managing how an interface (e.g., UI) of the vehicle UI appears for one or more corresponding modes.

The operation component 120 may enable selection or transition between different modes to occur. Examples of different modes may include a home screen mode, an active application mode, a control mode, an application menu mode, an event mode, etc.

Home screen mode may be a mode where a home screen is rendered or presented to a user. A home screen may be a main screen or a start screen of an operating system on which a vehicle user interface (UI) runs. In other words, the operation component 120 may enter home screen mode as a default mode. Additionally, in home screen mode, ambient information, widgets (e.g., weather, time, etc.), or supplemental functionality may be provided. Therefore, when the vehicle UI initializes, or at startup, the home screen may be the active application. When the vehicle UI is in home screen mode, one or more shortcuts to one or more applications may be presented or rendered, thereby enabling a user to select an application to be executed or launched. A selected application then becomes the active application upon launch or selection.

Active application mode may be a mode determined by the operation component 120 once an application is launched or executed. Otherwise, the active application may be a current application or an application currently being rendered on the display portion 114 of the interface component 110. As discussed, the default application may be the home screen, and upon selection of an application, the selected application may become the active application.

Control mode may provide a user with different control elements or control graphic elements which may be interactive, clickable, or selectable such that a user may select one or more commands therefrom. The control mode will be described in greater detail with reference to a control object generated by the presentation logic 140 herein.

Application menu mode may provide a user with different menu options or menu graphic elements which enables a user to change settings associated with an active application.

Additionally, an event mode may be a mode where an event, such as a telephone call, supersedes the active application in priority, thus causing the presentation logic 140 to arrange an event object over the active application, and the operation component 120 to pause or interrupt a current or active application in favor of the event, as will be discussed in greater detail in FIG. 9.

Further, the operation component 120 may adjust one or more of the modes based on presence information associated with one or more of the user inputs. In one or more embodiments, modes such as the home screen mode, the active application mode, the control mode, the application menu mode, the event mode, etc. may be adjusted in response to a user input. For example, the operation component 120 may toggle respective modes between two or more sub-modes, including an ambient sub-mode (e.g., when no user input is present) and a user-engaged sub-mode (e.g., when user input is detected or the user is hands-on with the input portion 112).

In this way, each mode may be rendered in at least one of two or more different sub-modes. For example, home screen mode may appear in an ambient sub-mode or a user-engaged sub-mode. The ambient sub-mode may be indicative of no or very little user interaction with the interface component 110, while the user-engaged sub-mode may be indicative of user interaction with the interface component 110.

Explained another way, each mode may be rendered differently or with additional or fewer objects depending on or based on whether a user is actively providing user input via the input portion 112 of the interface component 110. For example, with reference to the active application mode, this mode may be rendered to include a control object in user-engaged sub-mode (e.g., when a user has his or her hands on the input portion 112 of the interface component 110 or a hands-on mode). The control object may include graphic elements representing shortcuts or commands which, when selected, enable a user to control aspects of the active application.

Conversely, when the user removes his or her hands (e.g., a hands-off mode) from the input portion 112, the active application mode may be rendered in ambient sub-mode, without the control object. The ambient sub-mode may include a set of predefined objects generated by the presentation logic 140. Examples of these objects may include an active application object and a background object. Accordingly, it can be seen that the input portion 112 may be used to define a mode of the system 100, (e.g., user engaged or hands-on sub-mode vs. ambient or hands-off sub-mode).

In one or more embodiments, the operation component 120 may be controlled via voice input, and changes to modes or sub-modes may be made by providing voice commands to the system, without regard for contact made with the input portion 112 of the interface component 110. For example, if the user says, "Play a song by Boston", the operation component 120 may toggle or change the system to user engaged mode by virtue of the voice command. Similarly, after a period of time, the operation component 120 may switch to ambient mode when the user is no longer providing voice commands to the system 100.

The operation component 120 may include a storage portion 122 implemented as a hard drive, memory, flash memory, random access memory, read only memory, etc. In one or more embodiments, the storage portion 122 may house or store one or more of the applications, a state machine associated with one or more modes for the operation component 120, activity history for one or more applications, an application launch order history, previous applications, application history, predefined objects associated with different modes or sub-modes, etc. For example, the storage portion 122 may include instructions or mode information indicative of how switching from a first mode to a second mode should occur, a default transition time between modes, default response times to user inputs (e.g., amount of time between user input and rendering of corresponding object), etc.

The media component 130 may include tuners, radio tuners, antennas, receivers, radio receivers, etc. The media component 130 may receive media, content, audio content, video content, etc. from one or more content providers, one or more media sources, etc. For example, the media component 130 may receive content from radio stations, media from a portable device, media from a wireless connection, streaming media, etc. In this way, the media component 130 may enable users or occupants of a vehicle to listen to the radio, watch streaming content, listen to media, or otherwise consume content.

The presentation logic 140 may generate one or more objects which include one or more graphic elements, one or more interactive graphic elements, one or more selectable graphic elements, etc. Further, the presentation logic 140 may generate one or more objects based on a selected mode. For example, if a selected mode is a home mode, the presentation logic 140 may generate a home background object, a content object or icon object, and a home user interface object. The home background object may be an object which includes a default background for a home screen, such as a colored background. The content object or icon object may include one or more tiles, one or more content items, one or more shortcuts to one or more applications, etc. The home user interface object may include one or more commands or one or more widgets which appear on the home screen. For example, the home screen may include a time widget which displays the time or current time, a weather widget which displays weather information, etc.

The presentation logic 140 may generate one or more objects based on presence information associated with one or more of the user inputs, such as presence information indicative that a user is in contact or engaged with an input portion 112 of an interface component 110. Presence information, as used herein, may include information associated with whether the input portion 112 of the interface component 110 detects a user input. In other words, presence information may be indicative of whether a user is in contact with the input portion 112 of the interface component 110. Additionally, presence information may also be indicative of how long or a time period when a user last was in contact with the input portion 112 (e.g., a lag time, idle time, etc.). As an example, the presence information could indicate that a user last utilized the input portion 112 of the interface component 110 a time period of X milliseconds ago.

In one or more embodiments, the presentation logic 140 may generate one or more objects to be rendered merely when a user input is present. For example, the presentation logic 140 may generate a control object when a user places his or her finger on a touchpad of an interface component 110, thereby making the system 100 for vehicle user interface (UI) management appear to interact with an input of a user, touch input, etc. The control object may include one or more interactive graphic elements or selectable graphic elements associated with commands. Examples of commands may include a media selection, play, pause, stop, next track, previous track, volume controls, provide a rating, more information, etc. In this way, different objects may be generated, shown, or rendered based on interaction or touch input from a user. Examples of different objects may include a background object, an active application object, a control object, an instruction object, a preview object, a menu object, an event object, etc.

Explained a different way, when an input or user input (e.g., a finger of a user touching) is detected at a touchpad or input portion 112 of an interface component 110, the presentation logic 140 may generate a control object or other object associated with an active application. This additional object or control object may be rendered by the rendering component 150 for display on the display portion 114 of the interface component 110. When the same input or user input is no longer detected, the rendering component 150 may omit rendering of the control object for the active application, thereby returning the view of the vehicle UI to the original active application view, which may merely include an active application object overlaid on top of a background object, for example. Therefore, when a user's finger is placed on a touchpad or track pad, a control object appears or is rendered over an active application until the user removes his or her finger from the touchpad or track pad.

The presentation logic 140 may generate one or more objects with a delay period. In other words, other objects may be rendered prior to or before an object with an associated delay period when user input associated with generation of a particular object is received. For example, the presentation logic 140 may delay generation of the control object by one hundred milliseconds (e.g., a control object in delay period) or fade the control object in over one hundred milliseconds in response to presence information, a user input, a change in a mode, or a change in a sub-mode. Here, in this example, an active application object may be rendered, followed by the one hundred millisecond delay, followed by rendering of the control object or a fading in of the control object in response to a user input.

In one or more embodiments, the presentation logic 140 may generate one or more objects based on a sub-mode determined by the operation component 120. For example, an ambient sub-mode may include a predefined set of objects while a user-engaged sub-mode may include a different set of predefined objects. The user-engaged sub-mode may include additional objects, such as a control object, an instruction object, a preview object, etc. The storage portion 122 of the operation component 120 may store these sets of predefined objects in a lookup table which may be referenced when a mode or sub-mode is determined or selected by the operation component 120.

Different variations of transitions between an ambient sub-mode and a user-engaged sub-mode may be implemented in conjunction with transitions between modes by the operation component 120. For example, the user-engaged sub-mode may be temporarily engaged when an application is launched, such as from the home screen, thereby providing a user with a preview of different control options.

In one or more embodiments, the operation component 120 may enter the active application mode (e.g., from another mode, such as home screen mode) using the ambient sub-mode, corresponding to no user input. Here, the presentation logic 140 and rendering component 150 would not generate the control object or render the control object upon switching to an active application. Rather, the vehicle UI would merely include the active application object, and optionally, the background object. In this way, the operation component 120 may utilize the ambient sub-mode as the default sub-mode.

In other embodiments, the operation component 120 may have the presentation logic 140 generate a preview object corresponding to the control object to allow a user to view different control options when an application is first launched (e.g., when the operation component 120 initially enters an active application mode or within a time frame of entering active application mode). In this way, if the operation component 120 is at a home screen mode, and a user selects an application, a preview object (e.g., a semi-transparent object similar or identical to the control object) may be shown for a duration of X milliseconds, thereby enabling the user to determine what options may be available should he or she interact with the vehicle UI. Accordingly, the user, when entering an active application, would be presented, at least momentarily, with one or more available options or commands for a time duration, such as a temporary display duration. In this way, the operation component 120 may utilize the user-engaged sub-mode as the default sub-mode for a temporary time period.

As an example, if the operation component 120 is at home screen mode, and the user selects a radio application to be launched via an icon object of the home screen, the presentation logic 140 may generate a control object for the radio application with one or more interactive graphic elements or selectable graphic elements. The rendering component 150 may then render a composite image which includes the active application object (e.g., for the radio application) and the control object (e.g., including one or more control graphic elements) for a predefined duration of time or the temporary display duration, such as three seconds, and render a subsequent frame composite image with merely the active application object or the active application object and a background object, thereby allowing the user to preview one of more available control options within the control object.

As another example, the control object may be rendered as a preview object with alternative coloring, transparency settings, colors, sizes, etc. for graphic elements therein. For example, when the presentation logic 140 generates the preview object, the preview object may be generated based on the control object, at 50% transparency of the control object. In yet another example, the preview object may be rendered as a set of frames which highlights different control options. In other words, if there are three control graphic elements, each graphic element may be highlighted in a sequence of preview object frames. For example, a first set of frames may highlight or emphasize a first control graphic element, a second set of frames may highlight or emphasize a second control graphic element, and a third set of frames may highlight or emphasize a third control graphic element. In this way, when these sets of frames are presented sequentially, the operation component 120 may provide a preview of control graphic elements such that control graphic elements are identified in an individual, sequential manner.

In one or more embodiments, the presentation logic 140 may determine one or more objects (e.g., existing objects or new objects) which are to be changed or provided with interactivity, animation, etc. Examples of objects may include boxes, backgrounds, labels, etc.

The presentation logic 140 may generate objects in a manner to provide interaction, including movement, changes, or animations which cause graphic elements of an object to indicate focus or interactivity with a user. For example, when a control graphic element is selected, the presentation logic 140 may render one or more frames for the control object indicative of the selection, such as by flashing the control graphic element or rendering the control graphic element in a different color (e.g., green for selected). In this way, the presentation logic 140 may utilize color changes or pair color changes with a shift in posture of the vehicle UI.

The presentation logic 140 may adjust one or more aspects of one or more objects for an ambient sub-mode such that updated frames reflecting the adjustments produce or result in an animation. In other words, the presentation logic 140 may determine one or more properties for the objects which are to be changed. For example, when the operation component 120 determines that a mode or a sub-mode of a vehicle user interface is an ambient sub-mode, animations or transitions may be provided or rendered by adjusting, updating, or refreshing these aspects or properties, such as at least one of a color, an opacity, a line treatment, a size, a shape, frame rate, line weight, orientation, position, scale, stroke style (dotted, dashed, solid, etc.), a timing or number of frames associated with one or more graphic elements of one or more of the objects. In other words, the presentation logic 140 may adjust subsequent frames of the vehicle UI based on one or more of the aforementioned aspects. When rendered successively with one or more previous frames, this may provide animations or other visualizations or effects, such as a screen saver. In one or more embodiments, these aspects or properties may include other perceptual channels, such as sound or touch, for example.

In ambient sub-mode, the operation component 120 may cause the presentation logic 140 to generate a moving or dynamic background object. The presentation logic 140 may generate one or more graphic elements for the background object, which may include color gradients or patterns to facilitate creation or rendering of an animation. In this way, the operation component 120 may enable movement or animation of one or more graphic elements in a unique fashion, thereby providing graphic effects for vehicle UI management.

Further, as the operation component 120 changes between modes (e.g., goes from a first mode to a second mode or changes from a first sub-mode to a second sub-mode), transitions between respective modes may be rendered or provided. In one or more embodiments, the system 100 for vehicle UI management may have predefined transitions defined in a lookup table stored on the storage portion 122 of the operation component. For example, the storage portion 122 may indicate that a default transition is set to be one hundred milliseconds and be animated at sixty frames per second. Transitions from one mode to another mode or from a composite image of one mode to a composite image of another mode may be calculated in such a fashion (e.g., linearly changing aspects of graphic elements, such as transparency, etc.). In this way, the operation component 120 may manage interactivity (or transitions associated therewith) between a user interface and a user or in response to user inputs or touch inputs.

As mentioned, the vehicle user interface (UI) may provide for animations, depending on a mode or a sub-mode selected by the operation component 120. As an example, when the operation component 120 determines that the vehicle UI is in an ambient sub-mode, passive animation or visualizations may be rendered (e.g., for an object, such as a background object). In one or more embodiments, the presentation logic 140 may achieve this by updating or generating one or more subsequent frames for respective objects. These subsequent frames for respective objects may be generated by adjusting at least one of a color, an opacity, frame rate, a shape, or a size of one or more graphic elements within one or more of the objects.

With reference to a vehicle UI in active application mode and in an ambient sub-mode, the active application mode may include an active application object and a background object. The active application object may include one or more graphic elements indicative of a status of the active application. For example, if the active application is a radio application, the active application object may include graphic elements, such as a station name graphic element, a station number graphic element, an artist name graphic element, a song title graphic element, etc. Accordingly, the presentation logic 140 may generate an active application object based on a selected mode. In this example, because the selected mode is an active application mode, the presentation logic 140 generates an active application object corresponding to the active application or the radio application.

Continuing with this example, the background object (e.g., generated by the presentation logic 140) may include one or more graphic elements which are adjusted over time (e.g., in subsequent frames), thereby providing the appearance of a dynamic visualization. For example, in a first frame of a background object, a graphic element may be a first size. In a subsequent frame or second frame of the background object, the graphic element may be a second size (e.g., bigger or smaller than the first size). Accordingly, when the rendering component 150 renders the first frame followed by the subsequent frame, the graphic element may appear to change size. In this way, the presentation logic 140 may identify one or more new values that one or more properties for an object to be changed should be assigned. Explained another way, the presentation logic 140 may determine a final property value for an object. For example, the presentation logic 140 may determine that an object is to become red with an opacity of 50% over a ten second time span and provide these instructions to the rendering component 150.

The presentation logic 140 may adjust other aspects of graphic elements as well. For example, effects may include causing graphic elements to appear, disappear, pulse, fade in, fade out, fly in, fly out, float in, float out, split, dissipate, be wiped, grow in size, shrink in size, rotate, bounce, etc. Additionally, graphic elements may be adjusted in color, distortion, saturation, brightness, contrast, hue, transparency or opacity, motion paths, etc. These aspects or effects may be adjusted from frame to frame or from frame to subsequent frame based on presence information associated with one or more of the user inputs. In this way, the presentation logic 140 may adjust, control, or manage one or more aspects, such as a movement pattern, size, shape, transition, etc. of one or more graphic elements or corresponding objects.

Regardless, the appearance of the vehicle UI in an ambient sub-mode may be created by overlaying the active application object on the background object. Returning to the example where the active application is a radio application, when the active application object (e.g., the radio application object) is overlaid on the background object, which is animated, the resulting composite image and subsequent frames may thus provide ambience for users when they are not interacting with the active application or radio application.

With reference to a vehicle UI in active application mode and in a user-engaged sub-mode, the active application mode may include one or more additional objects (e.g., when compared with ambient sub-mode), an active application object and a background object. The additional object may be a control object. The active application object may include graphic elements similar or identical to the graphic elements of the active application object in an ambient sub-mode, as described above. If the vehicle UI is running a radio application as an active application, the presentation logic 140 may generate an active application object corresponding to the radio application.

In one or more embodiments, the background object of a vehicle UI in user-engaged sub-mode may not be identical to a background object associated with a corresponding ambient sub-mode. For example, the background object may be static rather than animated (e.g., thereby bringing additional focus to the control object which is now rendered). As another example, different aspects of graphic elements of a background object for user-engaged sub-mode may be emphasized over aspects of a background object for ambient sub-mode. In one or more embodiments, when a user is in contact with a touchpad or track pad of an interface component 110, the presentation logic 140 may generate the background object such that animation for the background object does not coincide with or overlap graphic elements of the control object, thereby mitigating distractions near control graphic elements. In this way, the presentation logic 140 may generate a background object based on presence information which indicates that a user is in contact with an input portion 112 of an interface component 110.

In other words, one or more graphic elements of an object may be adjusted over time (e.g., in subsequent frames) in a manner different than a manner associated with an ambient sub-mode. The appearance of the vehicle UI in a user-engaged sub-mode may be created by overlaying the control object on the active application object, which is overlaid on the background object.

When the user removes his or her hands from the input portion 112, the presentation logic 140 may transition or fade out the control object, returning the application to ambient-sub mode. In one or more embodiments, the presentation logic 140 may implement a delay or predefined delay based on the presence information. For example, the presentation logic 140 may have the rendering component 150 hide or fade out the control object two seconds (e.g., a control object out delay period) after the last user input is received, two seconds after user input is no longer detected, or two seconds after a user removes his or her finger from the input portion 112 of the interface component 110. In one or more embodiments, an object in delay period may be a delay between receiving a user input and having an object appear, while an object out delay period may be a delay between no longer receiving a user input and having the object disappear.

Further, the frame rate at which effects are rendered or timings, such as delay timings between receiving a user input and rendering a composite image from associated objects may be adjusted based on presence information, such as actions per minute or frequency of user input. In other words, if a user is entering commands on the input portion 112 in a rapid fashion (e.g., indicating impatience or that the user is in a rush), the presentation logic 140 may generate objects such that a transition between modes occurs in fewer frames than when a user provides commands more slowly. Therefore, the interface component 110 may learn or infer user preferences and have the presentation logic 140 and the rendering component 150 adjust responsiveness for the vehicle UI accordingly by managing timings associated with transitions between modes or sub-modes.

For example, if a user repeatedly issues the same command or user input (e.g., presence information indicative of repeated taps or repeated selection to launch the same application from the home screen), the presentation logic 140 may generate objects such that a transition from home screen mode to the active application mode (e.g., associated with the selected application) occurs quickly or in fewer frames than a default transition. In other words, if the default transition occurs at sixty frames per second for two hundred milliseconds, and a hurried user input (e.g., repeated selection or a frequency of user input greater than a threshold frequency) is detected, the presentation logic 140 may generate objects for a different transition, such as at sixty frames per second for one hundred milliseconds rather than the default two hundred milliseconds or at thirty frames per second for one hundred milliseconds. In this way, the presentation logic 140 may manage a length of a transition between a first mode and a second mode or transitions between a first sub-mode and a second sub-mode based on presence information associated with user inputs or inferences made therefrom.

In one or more embodiments, the presentation logic 140 may generate one or more objects based on different types of user inputs, such as multi-touch user inputs. Along the same lines, the operation component 120 may select different modes or sub-modes based on these different types of user inputs, thereby providing a diverse set of responsive schemes to user touch or user input. For example, the presentation logic 140 may generate a preview object based in a two-finger touch. The rendering component 150 may superimpose a semi-transparent rendering or version of the preview object over a current screen or active application object to demonstrate a preview of a proposed selection to a user.

Further, the rendering component 150 may render different objects based on multi-finger user input. For example, when no user input is detected, the rendering component 150 may render merely an active application object and/or background object. When a single finger user input is detected, the rendering component 150 may render the active application object, the background object, and a control object. When a multi-finger user input is detected, the rendering component 150 may render the active application object, the background object, the control object, and an instruction object. The instruction object may include one or more instructions associated with control graphic elements of the control object, and be superimposed over the control object, for example. In this way, the rendering component 150 and presentation logic 140 may generate and/or render one or more additional objects for each additional finger detected at the input portion 112.

The rendering component 150 may render one or more objects to form a composite image, which may be displayed at the display portion 114 of the interface component 110 or on other displays or other display components (not shown). In other words, the rendering component 150 may arrange one or more of the objects (e.g., stacking a first object on top of or overlaid on a second object). The rendering component 150 may arrange or manage one or more graphic elements within an object, one or more objects, an ordering of one or more of the objects, interaction, or interplay between respective graphic elements or respective objects, thereby managing how a vehicle UI will appear to a user. In one or more embodiments, the rendering component 150 may be responsible for executing commands or directives provided by the presentation logic 140.

The rendering component 150 may designate an object to be a top object, a secondary object below the top object, a tertiary object below the secondary object, etc. Further, rendering component 150 may adjust or determine of an opacity of one or more graphic elements within an object or an opacity of an object with respect to another object. For example, in an ambient sub-mode, the rendering component 150 may render a composite image from an active application object and a background object such that the composite image includes the active application object superimposed on the background object.

As another example, in a user-engaged sub-mode (e.g., hands-on the interface component 110 or hands-on mode), the rendering component 150 may render the composite image from the control object, the active application object, and the background object such that the composite image includes the control object superimposed on the active application object, superimposed on the background object. In other embodiments, the rendering component 150 may omit the background object for the user-engaged sub-mode such that composite image includes the control object superimposed on the active application object.

Regardless, the rendering component 150 may render different objects upon one another. In one or more embodiments, an object rendered on top of or over another object may result in a composite image where elements of respective objects are visible, while objects on the 'bottom' may not be visible over objects which are overlaid on 'top' of the 'bottom' objects. The rendering component 150 may render one or more of the objects or one or more of the composite images at the display portion 114 of the interface component 110.

Additionally, the rendering component 150 may render one or more subsequent frames of one or more objects in succession to provide subsequent frames for composite images. In this way, the rendering component 150 may allow a user to see or view animations by providing or rendering composite images in sequence or succession, for example. As a result, an animation may be formed which transitions from the composite image to the subsequent frame composite image. Explained another way, the rendering component 150 may render an animation by rendering one or more composite images in succession based on objects provided by the presentation logic 140 and presence information associated with user inputs.

The communication component 160 may include a telematics unit or wireless unit which accesses information via a telematics channel. Additionally, the communication component 160 may be implemented via or have access to one or more controller area networks (CANs) of a vehicle. In one or more embodiments, the communication component 160 may receive one or more graphic elements or one or more content items associated with one or more objects. For example, if the vehicle UI is in active application mode and the active application is a radio application, the communication component 160 may receive graphic elements for the album art and cause the presentation logic 140 to render the album art on the active application object.

Because the vehicle UI is coupled to the communication component 160 and the media component 130, the vehicle UI may enable a user to control one or more vehicle systems, such as a telephone system, audio, navigation, infotainment, in-vehicle applications, etc.

Figure 2:
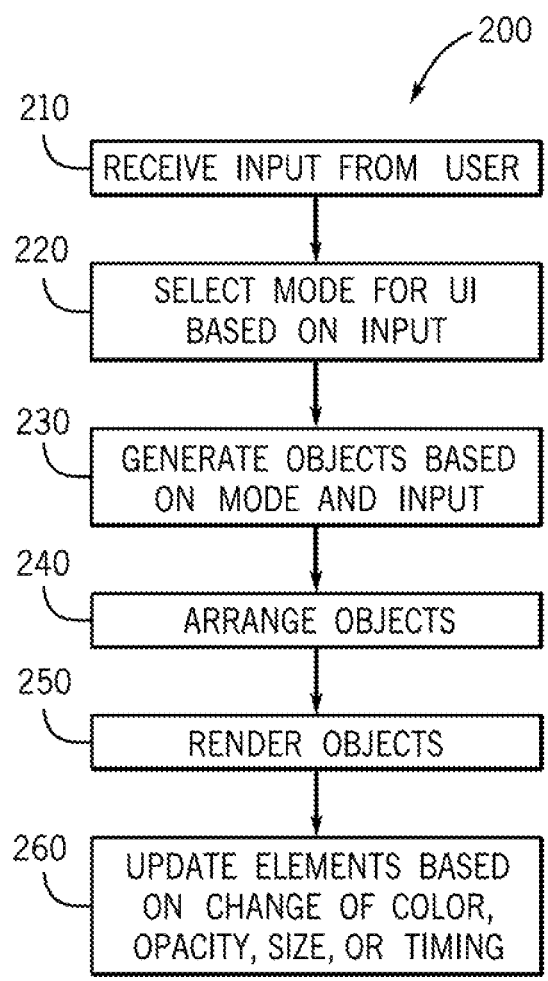
FIG. 2 is an illustration of an example flow diagram of a method for vehicle user interface (UI) management, according to one or more embodiments.

FIG. 2 is an illustration of an example flow diagram of a method 200 for vehicle user interface (UI) management, according to one or more embodiments. The method 200 may include receiving 210 one or more user inputs, selecting 220 one or more modes for a UI based on one or more of the user inputs, generating 230 one or more objects based on a selected mode and presence information associated with one or more of the user inputs, arranging 240 and rendering 250 one or more of the objects to form a composite image, and updating 260 elements within respective objects by changing a color, an opacity, a size, or a timing associated with a graphic element.

One or more figures may be described herein with reference to one or more components of the system 100 for vehicle UI management of FIG. 1. Further, figures may be described with reference to components or elements of previous figures. For example, discussion of a touch sensitive portion 330 of FIG. 3 may occur in subsequent figures, such as in FIG. 4, etc.

Figure 3:
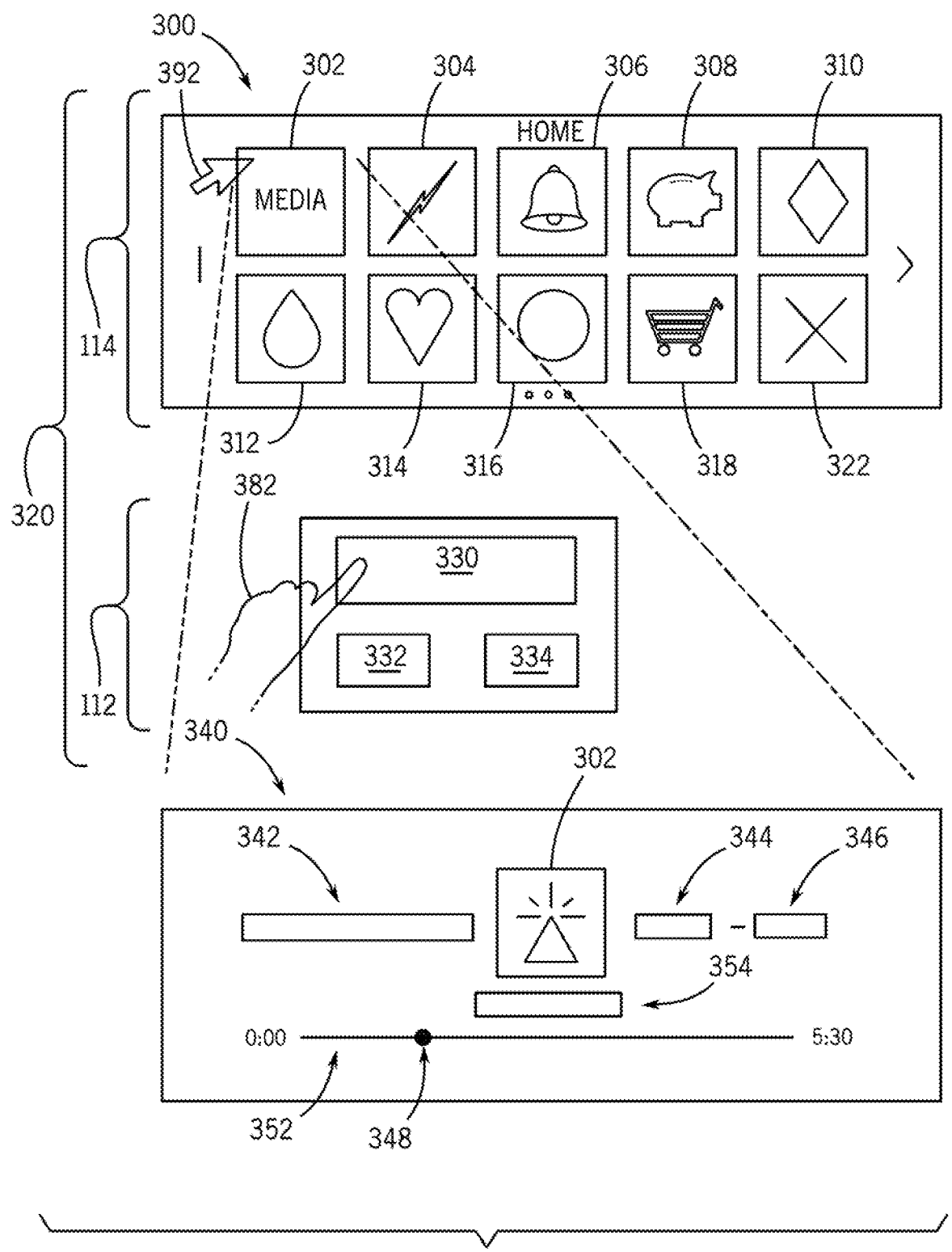
FIG. 3 is an illustration of an example selection of an active application from a home screen, according to one or more embodiments.

FIG. 3 is an illustration of an example selection of an active application from a home screen, according to one or more embodiments. At 320 (e.g., home screen mode), an application or icon 302 is selected and launched from a home screen 300 of a vehicle user interface (UI). Here, an input portion is provided at 112 and a display portion is provided at 114. The input portion 112 and the display portion 114 may be included in an interface component, such as the interface component 110 of FIG. 1. A user may use his or her finger(s) 382 to operate the input portion 112 of the interface component 110. The input portion 112 may include a touch sensitive portion 330, a back button 332, and a home button 334. If the user presses the home button 334, the operation component 120 may place the vehicle UI in home screen mode, thereby displaying or rendering the home screen 300. Accordingly, when a user presses the home button 334, and a current mode of the system 100 is not home screen mode, the home screen 300 (and all associated objects) would appear or be rendered on top of an existing, current, or active application. The home button 334 may be available in a global manner, such that when pressed, the operation component 120 causes the current or active application to be changed to a background application and have the home screen become the new active application. In this way, a user who is not at the home screen 300 may arrive at the first page of the home screen by pressing the home button 334.

In one or more embodiments, the operation component 120 may place the system 100 for vehicle UI management in an ambient sub-mode when no user input is detected from the input portion 112. This may result in one or more objects being hidden or not rendered. For example, the presentation logic 140 or the rendering component 150 may omit an object associated with the cursor 392 or render an icon object without labels. When user input is detected, the presentation logic 140 may generate corresponding objects or graphic elements. For example, the cursor 392 may be rendered and text labels shown in user-engaged sub-mode.

Movement of a hand or finger 382 of user along the touch sensitive portion 330 may cause a cursor or pointer to move between one or more shortcut icons 302, 304, 306, 308, 310, 312, 314, 316, 318, and 322. Respective shortcut icons may be shortcuts to different content items or applications. In one or more embodiments, the touch sensitive portion 330 is clickable such that a user may depress the touch sensitive portion 330 to make a selection corresponding to cursor 392. In other embodiments, when the user taps on the touch sensitive portion 330 with his or her hand or finger, the operation component 120 may interpret the tap as user input to execute a corresponding application, such as application or icon 302 on the home screen 300.

Upon selection of application or icon 302, the corresponding application is launched or executed, as seen at 340. 340 is an example illustration of a composite image of a plurality of objects, which includes a control object and an active application object for the selected application or icon 302. Examples of graphic elements within respective objects may include an artist name 324, album art, an album title 344, other info 346, a song title 354, a time scrubber 352, current playback time 348, etc. The operation component 120 may have the presentation logic 140 generate one or more frames for respective objects which illustrate a transition between respective modes (e.g., transition from home screen mode to active application mode). The presentation logic 140 may, for example, enlarge the icon from the home screen 300 to the center of the UI, such as at 302 of the active application 340, and have other graphic elements or objects fade in around the album art to facilitate such a transition.

In one or more embodiments, the input portion 112 and corresponding buttons 332 and 334 may be utilized to facilitate changing states or modes of the vehicle UI. For example, when a user taps the back button 332, the operation component 120 may revert or restore a current or active application, such as the active application 340, to a previous state. The storage portion 122 of the operation component 120 may record one or more previous states of an application (e.g., a back stack) and thus enable the operation component 120 to return a mode, sub-mode, or state of an application or active application to a previous or historical state. For example, if a media or music application, such as application 340 is launched, the storage portion 122 may note or record an initial state of the 340 application. If the user makes a change to a setting, such as by selecting 'repeat track', the application 340 enters a new state, and the storage portion 122 may store the change in state. To this end, when the user presses the back button 332, the 'repeat track' option may be deselected, as in the initial state of the 340 application, upon launch.

Therefore, when the user taps the back button 332, the previous state of the application that was previously opened based on the user's previous actions appears on the display portion 114. The historical state is presented to open the previous state of the application until the historical state is cleared, such as when the vehicle is turned off or the historical state is manually cleared. In one or more embodiments, the back button 332 may be utilized to launch previous applications. In other embodiments, this tapping of the back button may take a user back to a previous state of a currently opened application.

Other examples of back button utilization may include invoking a previous state of the system 100 for vehicle UI management. The previous state could be contained in an application that was previously open. The previous state could also be a page (e.g., page 1) of the home screen previously viewed by the user. Accordingly, the back button 332 may be a historical back function, and not a hierarchical back function, otherwise mirroring one or more of a user's previous actions. Further, pressing the home button 334 does not necessarily destroy the sequence of states that can be traversed with the back button 332. The back stack may be cleared when the vehicle is turned off.

In one or more embodiments, when a user double taps the home button 334, a previously launched application, different than the active application, is launched or brought into focus by the operation component 120. In other words, if the system 100 executes a first application, followed by a second application, followed by a third application (e.g., which is the active application), a double tapping of the home button 334 of the input portion 112 of the interface component 110 would bring the second application into focus, thereby making the second application the active application. A further double tap of the home button 334 would bring the first application into focus, thereby making the first application the active application, etc. In this way, the home button 334 may be utilized to switch from an active application object or mode to a previous application object or mode. A double click or double tap of the home button 334 when not in home screen mode thus switches the active application to a previous application.

Figure 4:
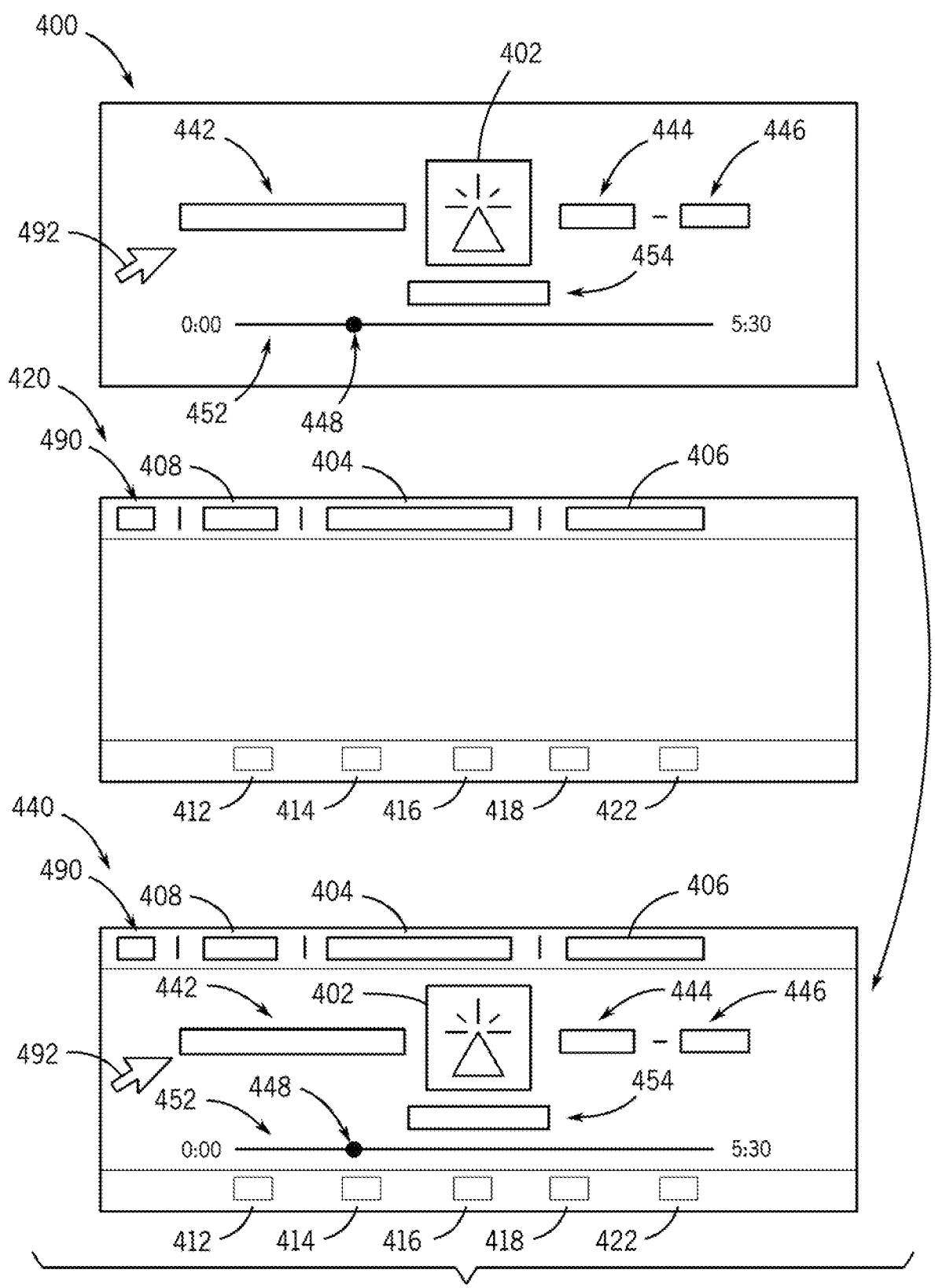
FIG. 4 is an illustration of an example image decomposed into a plurality of objects, according to one or more embodiments.

FIG. 4 is an illustration of an example image decomposed into a plurality of objects, according to one or more embodiments. In FIG. 4, a composite image 440 is formed from an active application object 400 and a control object 420 (e.g., overlaid over the active application object 400). The active application object 400 includes one or more graphic elements associated with currently playing content or media, such as an artist name 442, album art 402, album title 444, additional info 446, a time scrubber 452, a current track position 448 indicator, a song title 454, etc. Additionally, a cursor 492 may be displayed at a position corresponding to a position in the touch sensitive portion 330 of the input portion 112. The control object 420 may include one or more interactive graphic elements or one or more selectable graphic elements. For example, the control object includes a menu graphic element 490, a select by artist graphic element 408, a select more by same artist graphic element 404, and select more within same album graphic element 406. Here, selecting graphic element 408 would bring up an object including different artist choices. Selecting graphic element 404 would enable a user to view all content associated with the captioned artist. Selecting the graphic element 406 would enable a user to view all songs from a current album of the captioned artist.

Additionally, other control graphic elements may be provided, such as a previous song graphic element 412, shuffle graphic element 414, play/pause graphic element 416, repeat graphic element 418, and next track or song graphic element 422. Together, the active application object 400 and the control object 420 may be rendered or arranged by the rendering component 150 to form composite image 440, which includes graphic elements from respective objects.

The control object 420 may be generated by the presentation logic 140 or rendered by the rendering component 150 when touch input or user input is detected at the input portion 112 of the interface component, such as when a user places his or her hand on the touch sensitive portion 330 or depresses a button, for example. In one or more embodiments, the cursor 492 is only rendered or generated when the system 100 is in a hands-on modes or user-engaged sub-mode or may be generated in a different object, such as the control object 420. In one or more embodiments, the operation component 120 may enable automatic selection or 'grid lock' such that the cursor 492 is automatically and always hovering over a control graphic element, such as 490, 408, 404, 406, 412, 414, 416, 418, or 422.

In other words, the operation component 120 may cause the cursor 492 to always be selection ready by moving the cursor 492 from selectable control element to selectable control element based on user input, such as dragging a finger along the touch sensitive portion 330 of the input portion 112. In these embodiments, if there is only a single action or control graphic element on the screen, a finger on the trackpad highlights that single action no matter where on the remote or touchpad their finger is located.

Figure 5:
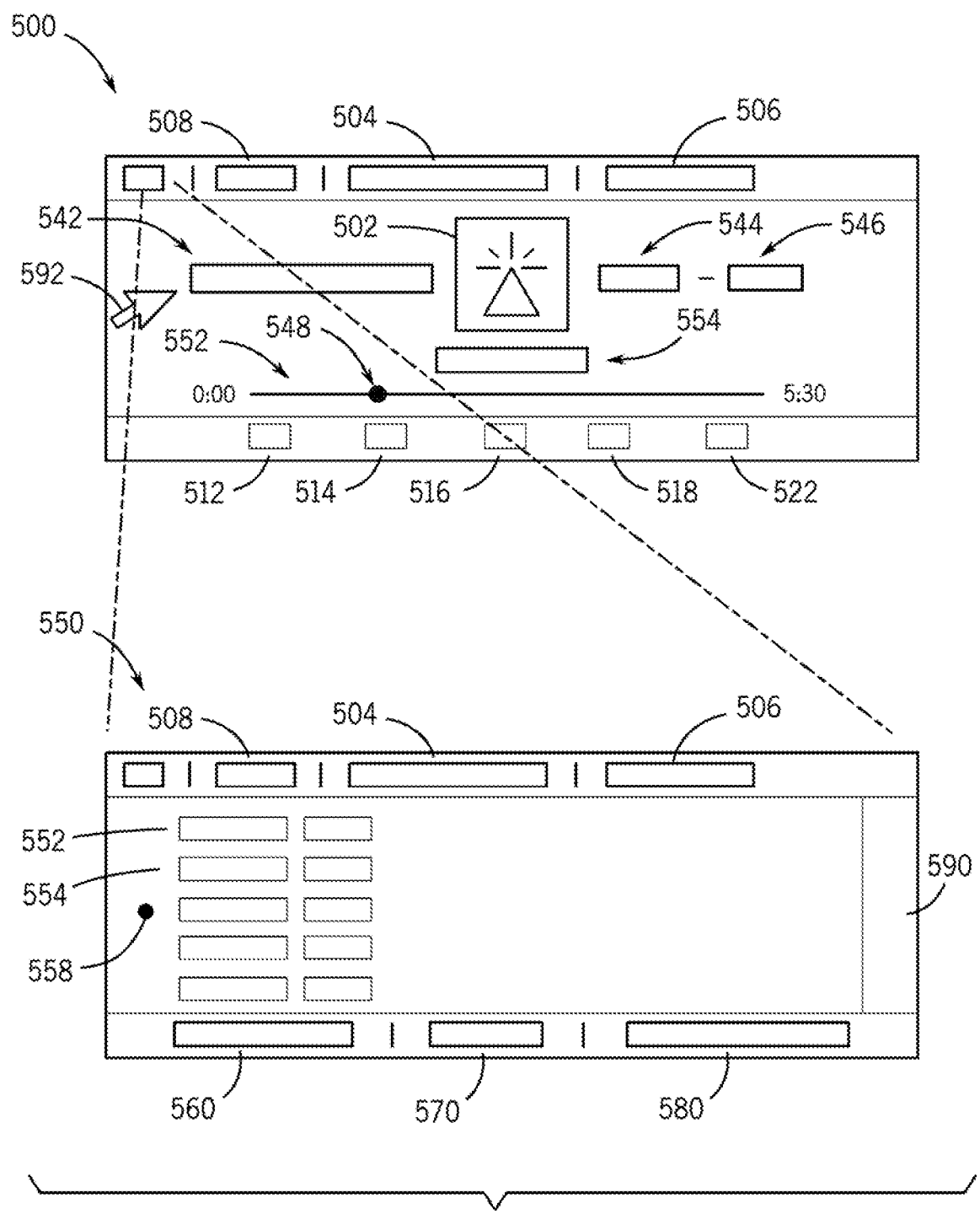
FIG. 5 is an illustration of an example menu interface, according to one or more embodiments.

FIG. 5 is an illustration of an example menu interface (500 and 550), according to one or more embodiments. Here, in FIG. 5, similar elements are presented as the elements of FIG. 4, such as an artist name 542, album art 502, album title 544, additional info 546, a time scrubber 552, a current track position 548 indicator, a song title 554, a previous song graphic element 512, shuffle graphic element 514, play/pause graphic element 516, repeat graphic element 518, next track or song graphic element 522, a select by artist graphic element 508, a select more by same artist graphic element 504, and select more within same album graphic element 506. Further, the menu graphic element (e.g., similar to 490 of FIG. 4), when selected, causes the presentation logic 140 to render a menu interface object 550, which introduces a song list and different playing options.

For example, the song list enables a user to select different media or content from a list (e.g., 552, 554, and currently playing 558). The now playing 560 graphic control icon may return a user to the view shown in 500. The favorites control graphic element 570 may cause the list to display favorite songs (e.g., at 552, 554, etc.), while the recently played control graphic element 580 may cause the list to display recently played material or content. The scroll bar 590 enables a user to select content which is below or off the screen of the display portion 114 by scrolling up or down within the list, for example.

In this way, the presentation logic 140 may generate menu interface object 550 which is presented over the active application and the control object (e.g., associated with the view of 500). Here, the application menu of 550 may be rendered in a manner which merely presents the application menu, and not the active application or the corresponding control object, for example. In other embodiments, the application menu 550 or corresponding control object may be rendered with a low transparency or high opacity such that the application menu 550 is more in focus than respective previous states or previously rendered objects (e.g., associated with the view of 500).

Figure 6:
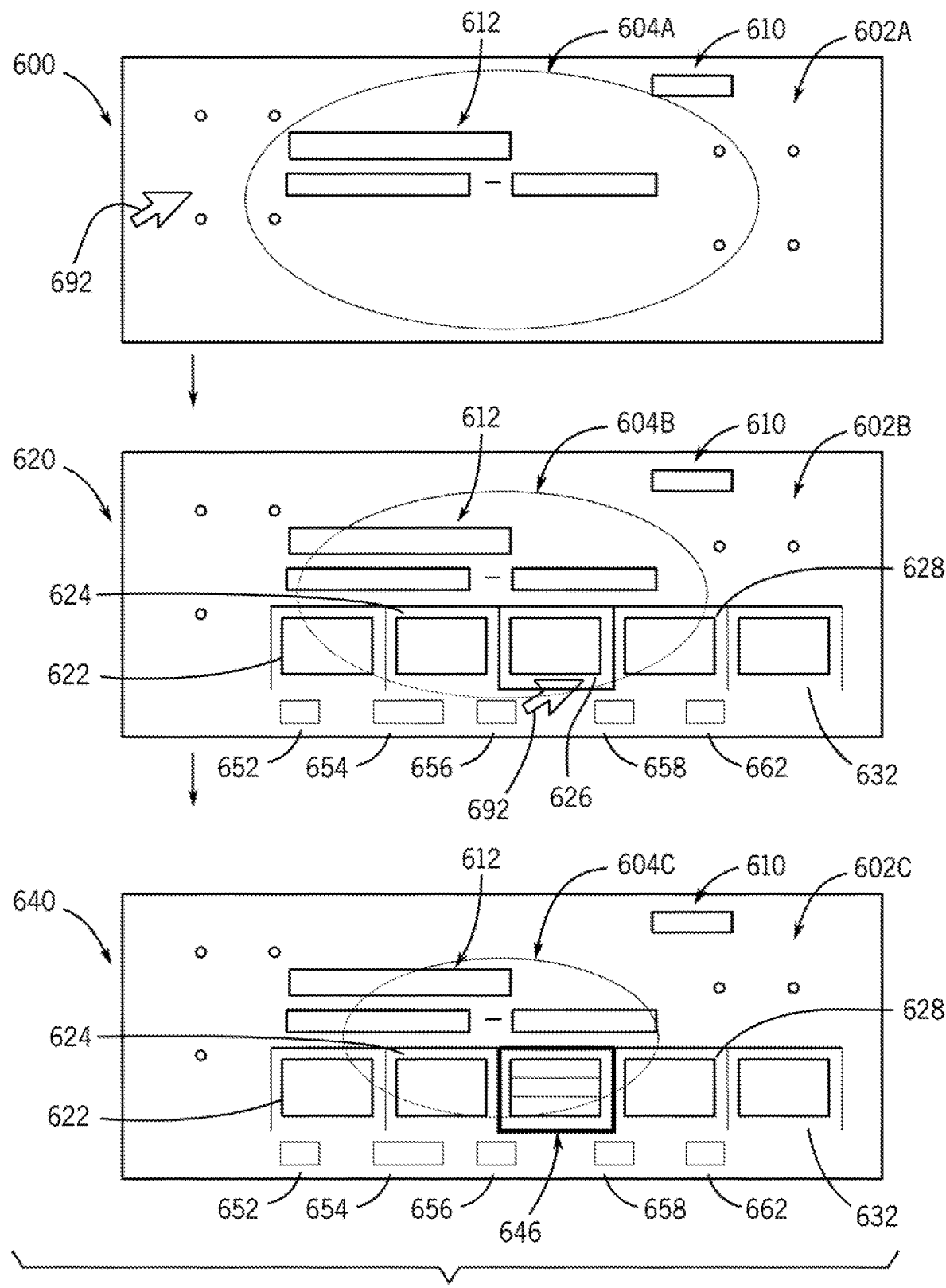
FIG. 6 is an illustration of example interactivity provided by a vehicle user interface (UI), according to one or more embodiments.

FIG. 6 is an illustration of example interactivity provided by a vehicle user interface (UI), according to one or more embodiments. At 600, the vehicle UI is in ambient sub-mode. Here, media information is rendered at 612, and a background object may include one or more graphic elements 602A (e.g., an animated grid pattern) and 604A (e.g., background colors of 604A coming forward or increasing in opacity) to form a screen saver. The time may be rendered as a graphic element 610 in the active application object. Movement of a cursor 692 (e.g., utilizing an input portion 112) may result in the vehicle UI changing to user-engaged sub-mode, which is shown at 620. Media information 612 may include graphic elements associated with passive media, currently playing media, current station, current track, artist name, song title, etc.

In user-engaged sub-mode 620, some graphic elements or objects may remain static, as to ambient sub-mode. For example, the time 610 and media information 612 may remain the same between 600 and 620. However, other graphic elements or objects may transition out of ambient sub-mode, such as the background object, which now includes graphic elements 604B and 602B. For example, colors could be changed (e.g., background colors of 604A dropping back or decreasing in opacity), the dot pattern could be faded out (e.g., dot grid decreases or ceases animation, decreases in frame rate), etc. Additionally, other objects, such as a control object may be generated and rendered. Here, different station selections may be provided via the control objects or graphic elements at 622, 624, 626, 628, and 632.

Further, other control graphic elements may be provided as well, such as seek back 652, AM/FM swap 654, play/pause 656, stop 658, seek forward 662, etc. When the user adds an additional finger as user input (e.g., provides a two finger hold), an additional instruction object may appear overlaid on the control object, which includes instructions on how to manage presets, such as the station selection graphic element 646, for example. In the meantime, graphic elements 604C and 602C may continue to fade out or otherwise react to the user input or touch input. Additionally, focus may be brought to 646 by displaying or enhancing graphic elements associated with interactive content, such as by bolding a hover rectangle over station selection graphic element 646. In one or more embodiments, one or more of the hover rectangles (e.g., 646) which are associated with or accompany interactive content may slowly come into focus and/or be locked into selection when user input is received such that one or more interactive graphic elements, such as station selection graphic elements 622, 624, 646, 628, 632, etc. is always tentatively selected. For example, moving a finger left on the input portion 112 would result in a hover rectangle being rendered over 624.

Figure 7:
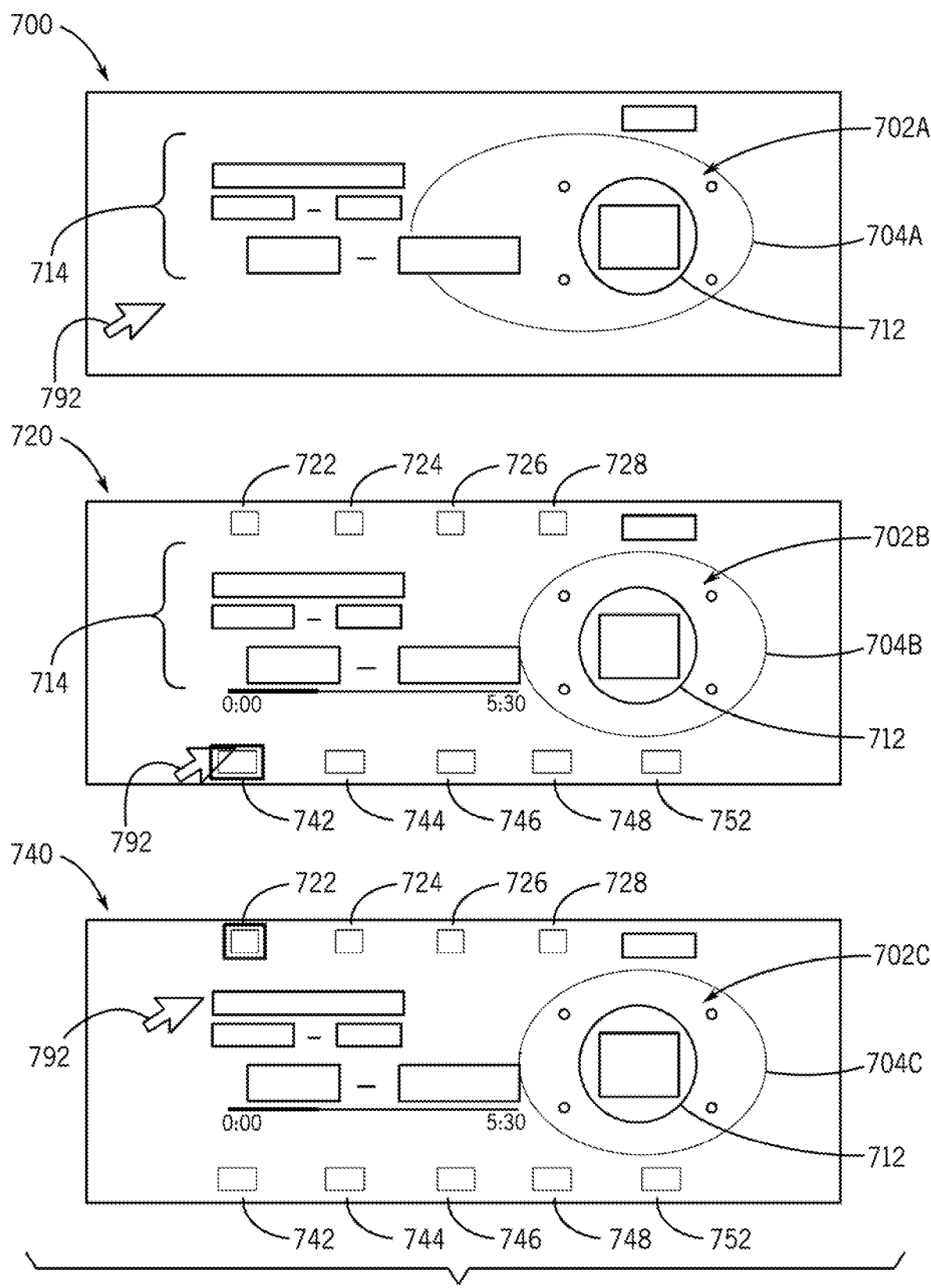
FIG. 7 is an illustration of example interactivity provided by a vehicle user interface (UI), according to one or more embodiments.
Figure 8:
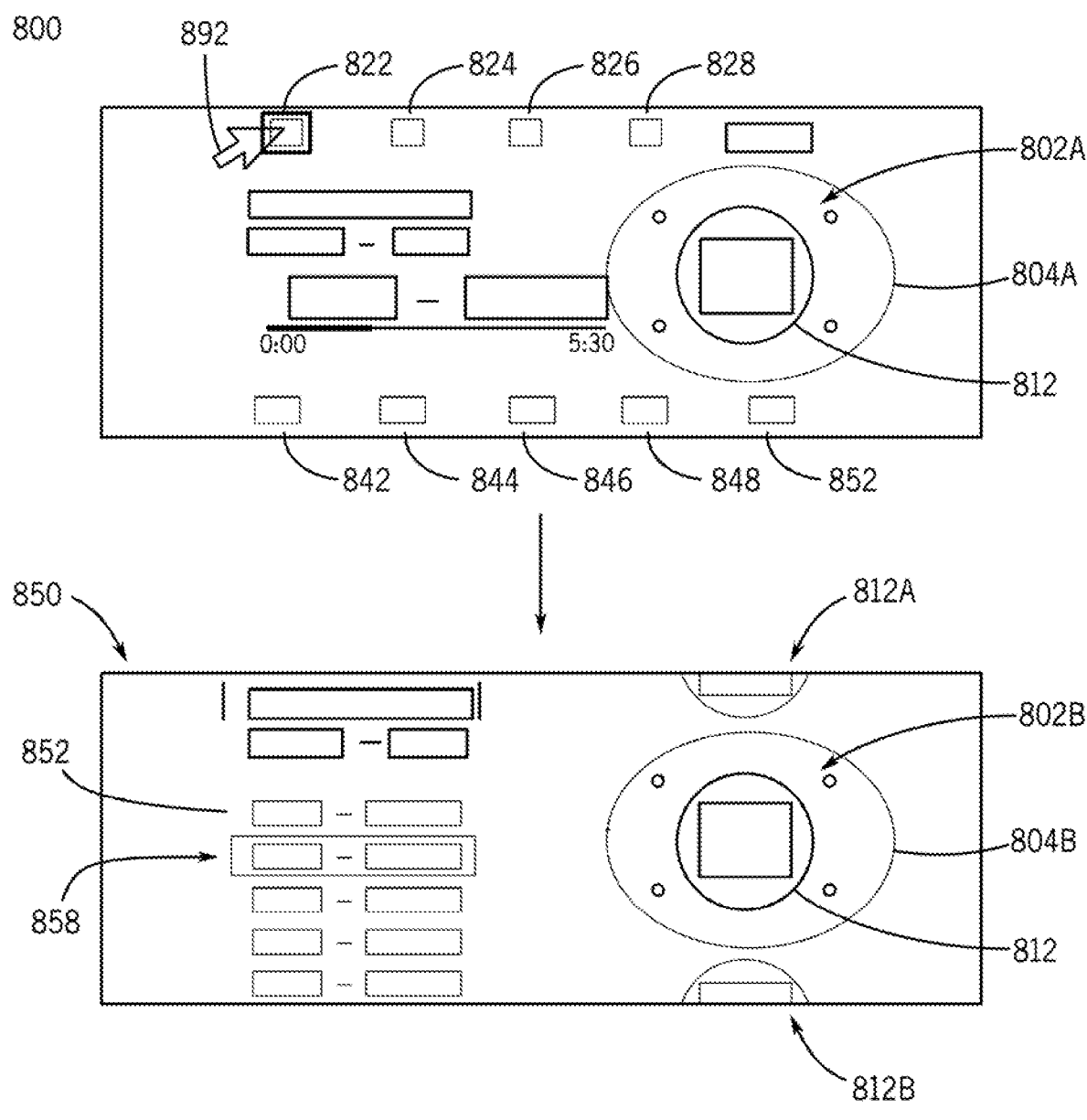
FIG. 8 is an illustration of an example menu interface, according to one or more embodiments.

FIG. 7 is an illustration of example interactivity provided by a vehicle user interface (UI), according to one or more embodiments, while FIG. 8 is an illustration of an example menu interface, according to one or more embodiments. FIGS. 7 and 8 illustrate a transition from an active application in ambient sub-mode 700 to an active application in user-engaged sub-mode 720 to an active application in another user-engaged sub-mode 740 to an active application in a previous state 800 to application menu mode 850. For example, a user may transition a system from the mode of 700 to the mode of 720 by providing user input to an input portion 112 of an interface component 110. The system may complete a transition from 720 to 740 over time. A user may change modes from 740 to 800 by selecting the control graphic icon pointed to by cursor 792 in mode 740. From 800, a user may open an application menu 850 by selecting the menu option 822.

It can be seen that graphic elements of a background object, such as 702A, 702B, 702C, 704A, 704B, and 704C, may change in size, shape, color, density, etc. to facilitate animation or ceasing of animation, as the vehicle UI transitions from 700 to 720 to 740. For example, the animation may cease or slow down when transitioning from 700 to 720. Additionally, other graphic elements may be present, such as media information 712 and 714. Control graphic elements (e.g., 722, 724, 726, 728, 742, 744, 746, 748, and 752), however, are introduced during the transition from ambient sub-mode 700 to hands-on or user-engaged sub-mode 720.

When the musical group or media information 714 is selected by cursor 792, the application advances to the next track at 800 (e.g., as seen at song title 2). Selection of the menu option 822 with cursor 892 changes the vehicle UI from user-engaged sub-mode, to application menu mode 850. Control graphic elements 822, 824, 826, 828, 842, 844, 846, 848, and 852 may be present because cursor 892 is being moved during the selection process. The background object, including 802A and 804A, may be animated when transitioning to application menu mode 850. In one or more embodiments, additional album art 812A and 812B may be included in one or more objects. For example, 812A may correspond with song 852, which is above the now playing track 858.

Figure 9:
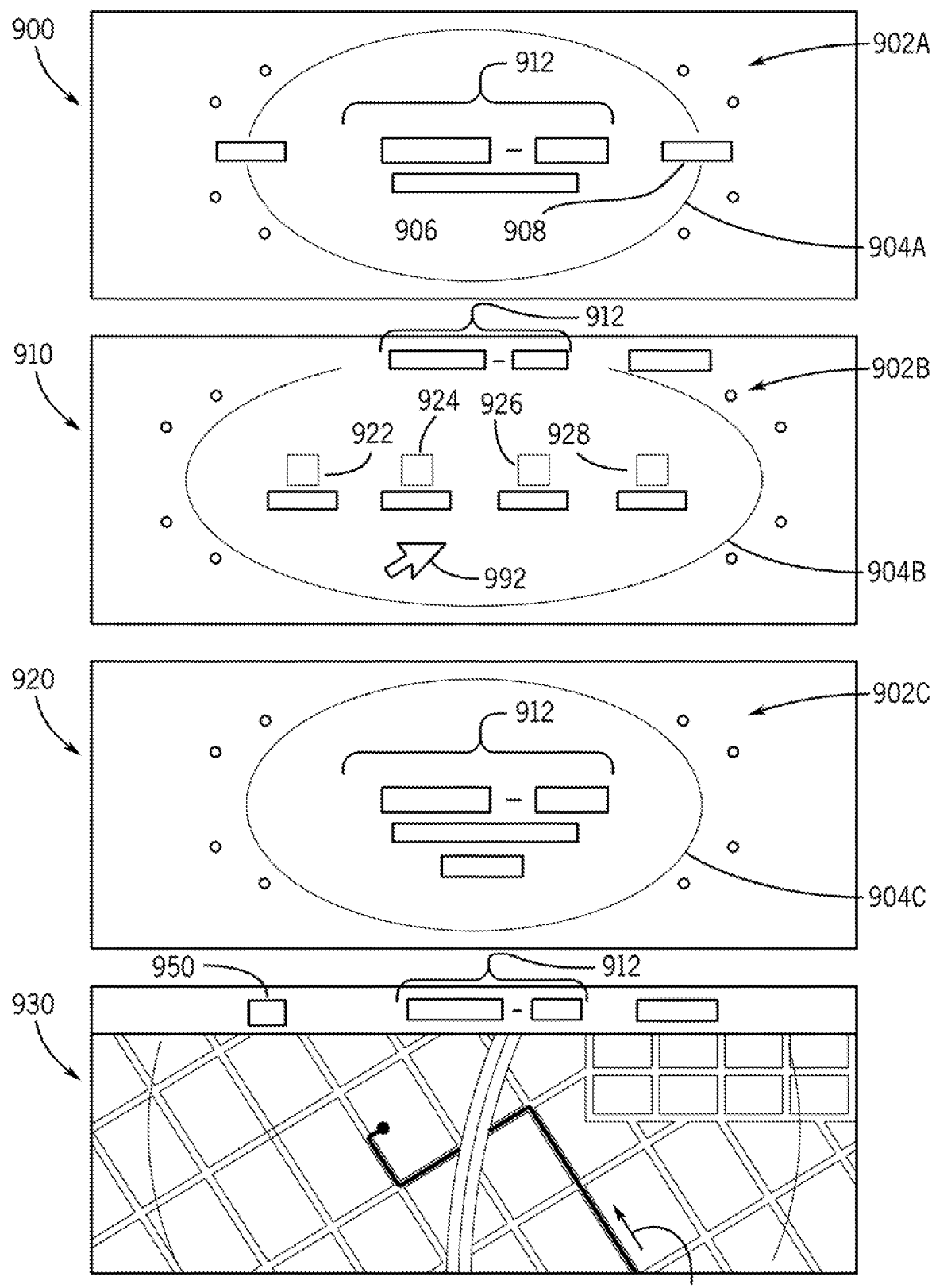
FIG. 9 is an illustration of example interactivity provided by a vehicle user interface (UI), according to one or more embodiments.

FIG. 9 is an illustration of example interactivity provided by a vehicle user interface (UI), according to one or more embodiments. An application running on the vehicle UI may be interrupted by events (e.g., where the operation component 120 automatically switches the vehicle UI to event mode, which includes an event object) which take priority over a current or active application.

In other words, an event mode may be imposed over any current mode when a predetermined event is activated, such as an incoming phone call, for example. Here, the event object is imposed (e.g., via the operation component 120) over currently active applications when an event occurs which takes priority over the current application or active application. At 900 (e.g., event imposed sub-mode), an event object is imposed over an active application (e.g., navigation application, seen at 930). The event in this example is a telephone call and the event object includes media information 912, such as the caller's name and the caller's number. A control object is rendered automatically, regardless of user input presence information, and includes an ignore control graphic element 906 and an answer control graphic element 908. The background object may include graphic elements 902A and 904A, which may animate over the course of a call or other states, such as 910 and 920, for example. At 900, the event object is automatically entered in user-engaged sub-mode or a preview mode because of the nature of the event.

At 910 (e.g., user-engaged sub-mode or hands-on mode), the vehicle UI may enter event mode in a user-engaged sub-mode when a call is answered or when user input is detected such that different control options are presented, such as end call 922, keypad 924, transfer 926, or mute 928. Here, at 910, the user-engaged sub-mode may be entered based on user input, such as touch input received from a touch sensitive portion 330 of an interface component 110 (e.g., of FIG. 1). The background object may include graphic elements 902B and 904B. In other embodiments, the call or event may be automatically entered into user-engaged sub-mode for a predefined amount of time after accepting or answering 908 the call. In one or more embodiments, the cursor 992 may be shown. In other embodiments, hover rectangles may be used. Further, auto selection on one or more of the control graphic elements 922, 924, 926, or 928 may be implemented such that the cursor 992 or a hover rectangle (not shown) is always hovering above one of the control graphic elements which is interactive or selectable, such as 906, 908, 922, 924, 926, 928, etc.

After a call is answered 908 and a predefined period of time has passed, the event mode may enter an ambient sub-mode where one or more aspects or objects are omitted. Here, at 920 (e.g., ambient sub-mode), merely background graphic elements 902C and 904C and media information 912 remain. As seen at 920, the media information 912 may be enlarged or repositioned within the active application object in response to the change to ambient sub-mode. Further, graphic elements 902C and 904C may be animated or be sped up from state 910, for example.

At 930 (e.g., previous application), with the double tap of the home button, a user may return to a previous application, such as a navigation 952 app, while the call is still in progress, as seen at 912, with the media information docked. Selection of the menu icon 950 may return a user to either 910 or 920, for example. In this way, a user who is multi-tasking between applications may be placed in an ambient sub-mode (e.g., 920) or a user-engaged sub-mode (e.g., 910, by default) of event mode, thereby returning the user to a previous application (e.g., event mode).

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification, as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning phase or training phase within a classifier constructor and feature selection module. Thus, a classifier may be used to automatically learn and perform a number of functions, including but not limited to determining according to a predetermined criteria.

Figure 10:
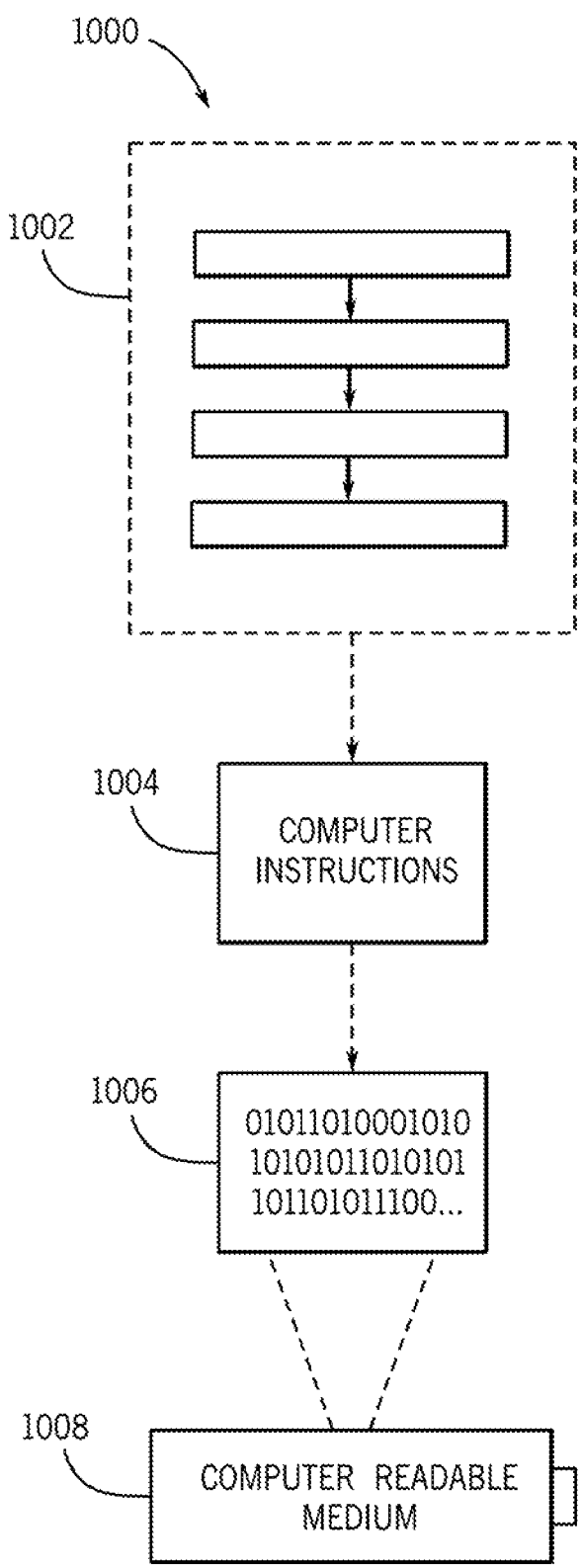
FIG. 10 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 10, wherein an implementation 1000 includes a computer-readable medium 1008, such as a CD-R, DVD-R, flash drive, a platter of a hard disk drive, etc., on which is encoded computer-readable data 1006. This computer-readable data 1006, such as binary data including a plurality of zero's and one's as shown in 1006, in turn includes a set of computer instructions 1004 configured to operate according to one or more of the principles set forth herein. In one such embodiment 1000, the processor-executable computer instructions 1004 may be configured to perform a method, such as the method 200 of FIG. 2. In another embodiment, the processor-executable instructions 1004 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 11 and the following discussion provide a description of a suitable computing environment to implement embodiments of one or more of the provisions set forth herein. The operating environment of FIG. 11 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media objects, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 11 illustrates a system 1100 including a computing device 1112 configured to implement one or more embodiments provided herein. In one configuration, computing device 1112 includes at least one processing unit 1116 and memory 1118. Depending on the exact configuration and type of computing device, memory 1118 may be volatile, such as RAM, non-volatile, such as ROM, flash memory, etc., or a combination of the two. This configuration is illustrated in FIG. 11 by dashed line 1114.

In other embodiments, device 1112 includes additional features or functionality. For example, device 1112 may include additional storage such as removable storage or non-removable storage, including, but not limited to, magnetic storage, optical storage, etc. Such additional storage is illustrated in FIG. 11 by storage 1120. In one or more embodiments, computer readable instructions to implement one or more embodiments provided herein are in storage 1120. Storage 1120 may store other computer readable instructions to implement an operating system, an application program, etc. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 1112. Any such computer storage media is part of device 1112.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1112 includes input device(s) 1124 such as keyboard, mouse, pen, voice input device, touch input device, infrared cameras, video input devices, or any other input device. Output device(s) 1122 such as one or more displays, speakers, printers, or any other output device may be included with device 1112. Input device(s) 1124 and output device(s) 1122 may be connected to device 1112 via a wired connection, wireless connection, or any combination thereof. In one or more embodiments, an input device or an output device from another computing device may be used as input device(s) 1124 or output device(s) 1122 for computing device 1112. Device 1112 may include communication connection(s) 1126 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims. Thus, it will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for vehicle user interface (UI) management, comprising:
   a touchpad for controlling a vehicle UI, receiving a user input; and
   a presentation logic generating a graphic element based on presence information indicative of whether a user is in contact with the touchpad, wherein the presentation logic generates the graphic element as a first graphic element based on a first multi-touch user input with the touchpad and wherein the presentation logic generates the graphic element as a second graphic element based on a second multi-touch user input with the touchpad, wherein the presentation logic renders the first graphic element more in focus when the user is in contact with the touchpad than when the user is not in contact with the touchpad, and wherein the presentation logic is implemented via a processing unit and a memory.

2. The system for vehicle user interface (UI) management of claim 1, wherein the first graphic element is a shortcut icon.

3. The system for vehicle user interface (UI) management of claim 1, wherein the first multi-touch user input is a two finger user input and the second multi-touch user input is a three or more finger user input.

4. The system for vehicle user interface (UI) management of claim 1, wherein the presentation logic generates the first graphic element and the second graphic element based on a mode of operation of the UI.

5. The system for vehicle user interface (UI) management of claim 1, wherein the presentation logic generates the graphic element based on an amount of time the user is in contact with the touchpad.

6. The system for vehicle user interface (UI) management of claim 1, wherein the presentation logic fades between the second graphic element and the first graphic element based on a change in user contact with the touchpad.

7. The system for vehicle user interface (UI) management of claim 1, wherein the presentation logic generates a subsequent frame for the graphic element by adjusting a color, an opacity, line weight, orientation, position, scale, stroke style, or a size of the graphic element.

8. The system for vehicle user interface (UI) management of claim 1, wherein the presentation logic generates the first graphic element based on a number of fingers the user has in contact with the touchpad.

9. The system for vehicle user interface (UI) management of claim 8, wherein the presentation logic generates the second graphic element based on a number of fingers the user has in contact with the touchpad.

10. The system for vehicle user interface (UI) management of claim 8, wherein the presentation logic fades the first graphic element based on a fewer number of fingers being in contact with the touchpad.

11. A method for vehicle user interface (UI) management, comprising:
    receiving a user input from a touchpad for controlling a vehicle UI;
    generating a graphic element as a first graphic element based on a first user input with the touchpad;
    generating the graphic element as a second graphic element based on a second user input with the touchpad which is a multi-touch user input; and
    rendering the graphic element on a display, wherein the first graphic element is rendered more in focus when the user is in contact with the touchpad than when the user is not in contact with the touchpad.

12. The method for vehicle user interface (UI) management of claim 11, wherein the first graphic element is a shortcut icon.

13. The method for vehicle user interface (UI) management of claim 11, wherein the first user input is a one finger user input and the second user input is a two or more finger user input.

14. The method for vehicle user interface (UI) management of claim 11, comprising generating the first graphic element and the second graphic element based on a mode of operation of the UI.

15. The method for vehicle user interface (UI) management of claim 11, comprising generating the graphic element based on an amount of time the user is in contact with the touchpad.

16. The method for vehicle user interface (UI) management of claim 11, comprising fading between the first graphic element and the second graphic element based on a change in user contact with the touchpad.

17. The method for vehicle user interface (UI) management of claim 11, comprising generating a subsequent frame for the graphic element by adjusting a color, an opacity, line weight, orientation, position, scale, stroke style, or a size of the graphic element.

18. The method for vehicle user interface (UI) management of claim 11, comprising generating the first graphic element based on a number of fingers the user has in contact with the touchpad.

19. The method for vehicle user interface (UI) management of claim 18, comprising fading the second graphic element based on a fewer number of fingers being in contact with the touchpad.

20. A system for vehicle user interface (UI) management, comprising:
    a touchpad for controlling a vehicle UI, receiving a user input; and
    a presentation logic generating a graphic element based on presence information indicative of whether a user is in contact with the touchpad, wherein the presentation logic generates the graphic element as a first graphic element based on a first user input with the touchpad and wherein the presentation logic generates the graphic element as a second graphic element based on a second user input with the touchpad which is a multi-touch input,
    wherein the presentation logic renders the first graphic element more in focus when the user is in contact with the touchpad than when the user is not in contact with the touchpad,
    wherein the presentation logic renders the second graphic element differently when the user is in contact with the touchpad than when the user is not in contact with the touchpad, and
    wherein the presentation logic is implemented via a processing unit and a memory.

* * * * *